United States Patent
Dovstam et al.

(10) Patent No.: US 8,121,421 B2
(45) Date of Patent: Feb. 21, 2012

(54) MEDIA CONTENT MANAGEMENT

(75) Inventors: Kristofer Dovstam, Bromma (SE); Rickard Sjöberg, Tumba (SE); Joel Askelöf, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 896 days.

(21) Appl. No.: 12/088,643

(22) PCT Filed: Sep. 28, 2005

(86) PCT No.: PCT/SE2005/001434
§ 371 (c)(1),
(2), (4) Date: Jul. 8, 2008

(87) PCT Pub. No.: WO2007/037726
PCT Pub. Date: Apr. 5, 2007

(65) Prior Publication Data
US 2009/0028428 A1    Jan. 29, 2009

(51) Int. Cl.
*G06K 9/46* (2006.01)
(52) U.S. Cl. ........................ 382/233; 382/232
(58) Field of Classification Search .................. 382/276, 382/298, 190, 232, 233; 348/467–468; 375/E7.198
See application file for complete search history.

(56) References Cited

U.S. PATENT DOCUMENTS

| | | | |
|---|---|---|---|
| 6,574,279 | B1 | 6/2003 | Vetro et al. |
| 7,020,721 | B1* | 3/2006 | Levenberg .................... 709/246 |
| 7,738,550 | B2* | 6/2010 | Kuhn ........................ 375/240.01 |
| 7,782,941 | B2* | 8/2010 | Suzuki et al. ............ 375/240.12 |
| 2001/0047517 | A1* | 11/2001 | Christopoulos et al. ........ 725/87 |
| 2002/0157112 | A1 | 10/2002 | Kuhn |
| 2005/0201461 | A1 | 9/2005 | Suzuki et al. |

FOREIGN PATENT DOCUMENTS

| | | |
|---|---|---|
| EP | 0 571 171 A2 | 11/1993 |
| EP | 1 137 289 A2 | 9/2001 |
| EP | 1 162 845 A2 | 12/2001 |
| GB | 2 254 977 A | 10/1992 |
| JP | 2002-077855 A | 3/2002 |
| WO | WO 01/69936 A2 | 9/2001 |

* cited by examiner

Primary Examiner — Daniel Mariam

(57) ABSTRACT

The invention relates to media management and combats media degradations arising when transcoding the media. The invention solves this by—generating processing hints based on the media transcoding. The hints are employed for controlling a post-transcoding processing of the transcoded media content in connection with rendering the media. The hints and this controlled processing increases the user-perceived quality when rendering the media by mitigating the media degradations caused by the transcoding. The processing hints could specify how the actual transcoding was performed by including values of the employed transcoding parameters or information of the alterations to the media caused by transcoding. Furthermore, instructions or commands for appropriate post-transcoding processing could also be processing hints according to the invention.

28 Claims, 8 Drawing Sheets

MEDIA CONTENT MANAGEMENT

TECHNICAL FIELD

The present invention generally relates to management of media content and in particular to media content processing in order to mitigate media degradations caused by transcoding the media.

BACKGROUND

Presentation and rendering of images, graphics and video and other types of media and multimedia content on data processing systems and user terminals, such as computers, and in particular on mobile terminals have increased tremendously the last years. This increase in media rendering and utilization of vastly different data presenting devices and terminals often requires processing of the media content in order to adapt the content to the capabilities of the particular rendering devices. For example, a first wireless communications unit generates an image in a first image format and according to a first image standard, which are compatible with the capabilities of the communications unit. The generated image is then, wirelessly, sent to a second communications unit having other image processing capabilities. In order to enable the second communications unit to render and display the image, an image transcoding is preferably performed prior the rendering.

Image transcoding, and media transcoding in general, changes the properties of the media e.g. by transcoding the media between different encoding standards and/or convert the media between different media formats. The resulting transcoded media can be rendered in the target rendering device since it is now in a format and according to a standard that the rendering device can handle.

The European patent application no. 1 137 289 discloses methods and apparatuses for compensating for various processing capabilities of receiving terminals regarding moving picture content. A receiving terminal requests multimedia content from a data access server by transmitting a content request and information of its own processing capabilities. The access server then requests content information from a multimedia content server and subsequently receives the requested multimedia content. The access server utilizes the terminal information and the content information as transcoding hints when it transcodes the received multimedia content into a format that is "as optimal as possible" for the receiving terminal. The so-transcoded content is finally transmitted to the receiving terminal.

The cited European application, thus, teaches usage of transcoding hints in the media transcoding in order to adapt the media to the particular rendering device. Although this transcoding enables rendering the media at the rendering device, the transcoding itself causes degradations and alterations of the media. For example, an encoding standard can lack the options and semantics to incorporate the functionality of another encoding standard, which means that the transcoded media not fully can exploit the functionalities of the original media format/standard when transcoded into a new format/standard. This in turn will lead to that, even though the media actually can be rendered, the user-perceived quality when rendering the transcoded media is far from perfect and typically (much) worse compared to rendering the original non-transcoded media, if possible.

SUMMARY

There is a need for a media processing and management that allows media and multimedia content to be transcoded between different media formats and standards and compensates or efficiently handles those media degradations and alternations caused by the transcoding process.

The present invention overcomes these and other drawbacks of the prior art arrangements.

It is a general object of the present invention to provide a technique that can be used for combating and mitigating degradations on, and negative and deleterious alterations to media content caused by transcoding the media content It is another object of the invention to provide a generation and usage of processing hints that enhances the user-perceived quality when rendering media content that has been transcoded.

It is a particular object of the present invention to provide processing hints that are generated based on the transcoding of media content and enable control of processing of the transcoded media in order to obtain a visually and/or audibly more appealing media when rendered.

These and other objects are met by the invention as defined by the accompanying patent claims.

Briefly, the present invention involves management of media and multimedia content and in particular processing of such media and multimedia content in order to mitigate and combat media degradations caused by transcoding the content and increase the user-perceived quality when rendering the transcoded media.

A media content management of the invention involves transcoding media content into a format or standard that an intended receiver of the content can handle. In the present invention, processing or rendering hint is generated based on the actual transcoding of the media. In addition, the hint enables control of a post-transcoding processing of the transcoded media to increase the user-perceived quality when rendering the transcoded media content.

The processing hint is generated in connection with the transcoding process, e.g. during or following the transcoding. Such hints can include information reflecting how the transcoding actually was performed for the current media content, e.g. by including values of the transcoding parameters and settings employed in the current media transcoding. Alternatively, or in addition, the hints can contain information of the alterations to the media caused by the transcoding. Furthermore, instructions or commands for appropriate post-transcoding filtering and processing could also be processing hints according to the invention.

In either case, the hints are generated in order to be subsequently used when controlling the post-transcoding processing of the transcoded media in connection with the rendering of the media. The processing hints and the media processing performed based on the hints are employed in order to mitigate and alleviate deleterious alterations and degradations caused by the transcoding of the media. The hints are generated by or based on information from the transcoder, which has knowledge about the degradations, alterations and limitations of the transcoded output it produces. The rendering device then uses the hints to render the media resulting in an enhanced user experience.

The processing hints are further associated with the transcoded media content. This association can be realized by adding the processing hints to the file containing the transcoded media content. For example, the 3GP file format is employed among other for video content. This file format includes a user data field, in which more or less any data can be entered. The processing hint according to the present invention can, thus, be entered in such a user data field of a 3GP file format in order to obtain an association between the hint and the transcoded video content.

Alternatively, the processing hint(s) can be provided separately as long as a rendering device is able to identify which transcoded media content the processing hint(s) belong and should be applied to. This means that the processing hint(s) could be regarded as meta-data associated with the transcoded media content. When provided in a separate file, this file could include an identifier of the corresponding media content file or the media content file could include an identifier of the processing hint file.

When rendering the transcoded media content, the content is first decoded and the processing hints associated with the content are provided, e.g. extracted from a combined media and hint file. The processing hints are then used when controlling the post-transcoding processing of the media that is performed before or in connection with rendering the content. Using the hints in the media processing and processing control increases the user-perceived quality when rendering the media compared to rendering the media without any such media processing and processing control.

The processing hints of the invention can, for example, include information that allows identification of border regions in a resized (widescreen-adapted) image or video sequence. The hints can then be used for combating the color bleeding that otherwise occurs in the interface between border and image. A further example includes processing hints that include an adjusted brightness level of a transcoded image or video. This brightness information is then employed in connection with the rendering in order to prevent further brightness adjustments that could lead to too bright or dark images or video.

Processing hints that define appropriate post-filtering to be used in order to alleviate introduced block artifacts are also within the scope of the present invention. The processing hints can also be employed for re-introducing data in the media content that has become lost or are present at inadequate quality levels following the media transcoding.

The invention offers the following advantages:
- Can be used as a complement to existing transcoding schemes and systems in order to increase the user-perceived quality of the transcoded media during the media rendering;
- Mitigates and alleviates media degradations and limitations and quality-deleterious alterations caused and introduces by media transcoding; and
- Provides improved possibilities of applying transcoding of media content without experiencing low quality media.

Other advantages offered by the present invention will be appreciated upon reading of the below description of the embodiments of the invention.

SHORT DESCRIPTION OF THE DRAWINGS

The invention together with further objects and advantages thereof, may best be understood by making reference to the following description taken together with the accompanying drawings, in which.

DETAILED DESCRIPTION

Figure 1:
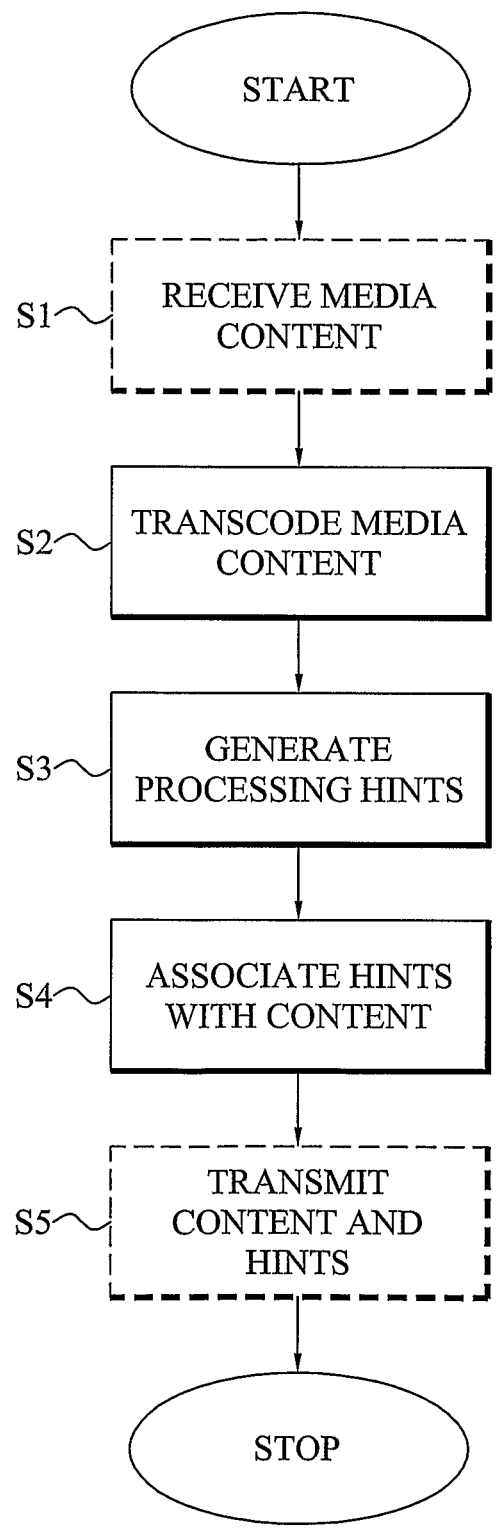
FIG. 1 is flow diagram illustrating an embodiment of managing media content according to the present invention.

Throughout the drawings, the same reference characters will be used for corresponding or similar elements.

The present invention relates to management of media and multimedia content and in particular to the processing of such media and multimedia content in order to mitigate and combat media degradations caused by transcoding the content and increase the user-perceived quality when rendering the transocded media.

The present invention is a complement to and can be used in connection with existing media transcoding schemes and systems in order to compensate for the alterations and degradations that such transcoding schemes and systems inevitably causes to the media during the transcoding process.

As was mentioned in the background section, media transcoding changes the properties of the media by transcoding it between different encoding standards and media formats that are adapted for different rendering devices and user terminals. Typically, such an encoding standard lacks the options and semantics the functionality of another encoding standard or an encoding standard can lack the ability to alleviate the effects of its limitations. This results in that even though the transcoding can be performed based on and adapted according to a particular rendering device, as illustrated by the European patent application no. 1 137 289, the transcoding itself causes alterations and degradations that lower the user-perceived quality when rendering the transcoded media. This is discussed and exemplified in more detail below.

The present invention is applicable to any form and type of media including, but not limited to, images, audio, voice, video and also multimedia and other media types that are capable of being perceived, during rendering, by a user. As a person skilled in the art understands, the particular rendering scheme or system employed in such a media rendering is dictated by the particular type of media content. For example, in the case of an image, the rendering device includes functionality for presenting the image on a display screen, whereas video content or audio content will be played or played back by means of a (video) screen or loudspeaker, respectively.

The transcoding to which the present invention can be applied is any media transcoding that alters the media content by e.g. transcoding it between different media/encoding standards and formats. This means that the invention can be applied to e.g. image transcoding, audio transcoding, video transcoding, etc.

The basic idea of the invention is to generate processing hints based on the employed media transcoding. These hints enable control of processing of the transcoded media before or in connection with rendering the media content. This control of the media processing alleviates the media degradations caused by the transcoding and enhances the quality of the media. Thus, in clear contrast with the hints described in the European patent application no. 1 137 289, the processing hints of the invention are generated based on and in response to the media transcoding and are adapted for usage in controlling the post-transcoding processing and rendering of the transcoded media. In the above-identified European application, transcoding hints are generated before (based on terminal capabilities and media content information) the transcoding and are used in the transcoding. The present invention can therefore by used as a complement to the transcoding disclosed in this European application or other prior art transcoding methods.

FIG. 1 is a flow diagram illustrating a method of managing media content according to an embodiment of the present invention. The method starts by the optional step S1. In this step S1, media content to be transcoded is received from a media content source or provider. This content source could be an external unit, e.g. a transmitting communications unit or content server or provider, wirelessly or wiredly transmitting the media content to a transcoder unit. Alternatively, the media content source could be a content storage or media content engine arranged in connection with the transcoder in e.g. a network node, content provider or mobile communications unit.

Figure 2:
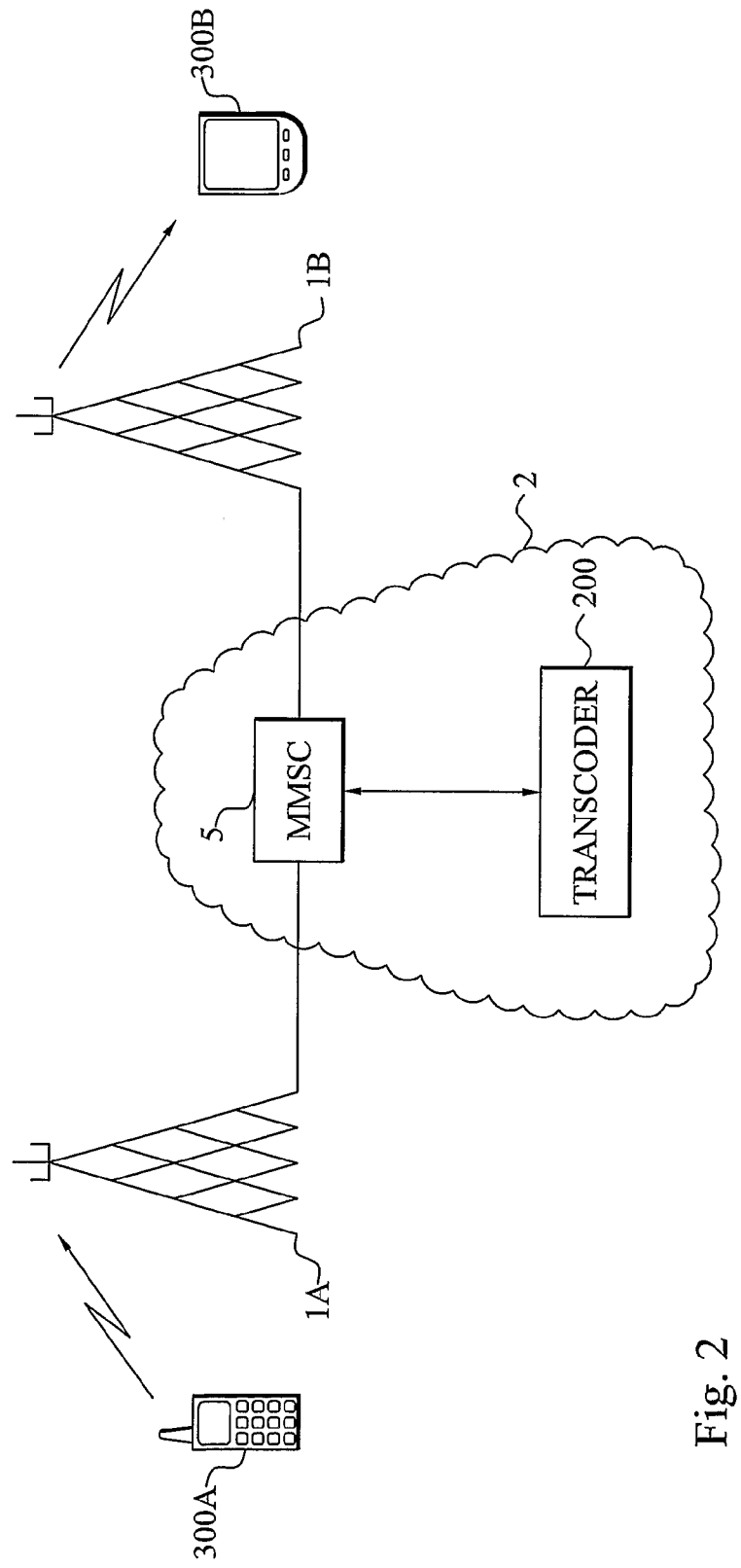
FIG. 2 is a schematic overview of a wireless communications system, to which the teachings of the present invention can be applied.

FIG. 2 schematically illustrates a portion of a wireless communications system to which the teachings of the present invention can be applied. As is schematically illustrated in the figure, a media content source here in the form of a transmitting mobile unit 300A transmits media content represented by a Multimedia Messaging Service (MMS) message to a receiving mobile unit 300B. The MMS message could e.g. include an image taken or generated by the transmitting unit 300A and adapted to the size of the display screen of the transmitting unit 300A. However, the intended receiving unit 300A has a much larger display screen. A transcoding of the image from the image format employed by the transmitting unit 300A into the format used by the receiving unit 300B is therefore required. This transcoding operation can be performed by a transcoder 200 implemented in a network node of the system, e.g. in a base station 1A, 1B or some other network node in the radio access network 2 or the core network portion of the communications system. In FIG. 2, the transcoder 200 is implemented, in an exemplary manner, in connection with or in a multimedia messaging service center (MMSC) 5 that is used by the communications system for processing multimedia messages transmitted throughout the system.

The transcoder 200 transcodes the image in the MMS message into the new format by employing the present invention. The transcoded image is included in the MMS message that is forwarded to a base station 1B, to which the receiving unit 300B is connected. The base station 1B sends the MMS message to the mobile unit 300B that renders and displays the included image.

Returning to FIG. 1, the media content is of course not received from some external transmitting unit in the case of a media content source implemented in connection with the transcoder. In such a case, the optional step S1 can be omitted.

In a next step S2, the media content is transcoded between different encoding or media standards and formats. This transcoding of the media is done in order to enable an intended rendering device to render the media content.

With reference anew to FIG. 2, the transcoder 200 preferably performs the image transcoding based on information of the receiving unit 300B so that the resulting transcoded media is in a format adapted to and manageable by this receiving unit 300B. The transcoder 200 could, for example, have access to a list of different terminal types occurring in the communications system and which image formats these terminals employ. Also information of the transmitting unit 300A and/or the media content itself could be employed during the transcoding in order to generate a transcoded media content that is as optimal as possible for the intended receiving unit 300B.

However, even though the transcoder 200 can use input information regarding the terminal types and capabilities of the participating communications units 300A, 300B and the media content, the transcoding will inevitably deteriorate the quality of the media compared to the original unprocessed media.

For example, when transcoding an image or video having a given image format into another image format, such as a widescreen format, one-colored boarders are typically positioned above and below and/or to the left and right of the image. However, when compressing such an image as a part of the transcoding process, the artifact known as bleeding occurs, which imply that colors tend to smear. This bleeding results in that a less colored region, typically the borders, will show traces of the colors included in the colorful region, typically the original image frame (and also vice versa). As a consequence, the user-perceived quality of the transcoded image will be lowered when displayed for a user.

Furthermore, a video could, during the transcoding, be resized from Quarter Common Intermediate Format (QCIF) to a sub-QCIF, producing boarder areas of one-colored pixels to the left and right of the actual video. During encoding of the video content, other colors will bleed into the one-colored boarder areas.

As a consequence, in a next step S3 of FIG. 1, processing hints according to the invention are generated based on the actual media transcoding. These processing hints are generated in connection with the transcoding process, e.g. during or following the transcoding. The hints can include information reflecting how the transcoding actually was performed for the current media content. The hints are generated in order to be subsequently used when controlling the post-transcoding processing of the transcoded media in connection with the rendering of the media content. The processing hints and the media processing performed based on the hints are employed in order to mitigate and alleviate deleterious alterations and degradations caused by the transcoding of the media. The hints are generated by or based on information from the transcoder, which has knowledge about the degradations, alterations and limitations of the transcoded output it produces. The rendering device then uses the hints to render the media resulting in an enhanced user experience.

The processing hints are associated with the transcoded media content in a next step S4. This association can be realized by adding the processing hints to the file containing the transcoded media content.

For example, the 3GP file format is employed for, among others, video content. This file format includes a user data field, in which more or less any data can be entered. The processing hint according to the present invention can, thus, be entered in such a user data field of a 3GP file format in order to obtain an association between the hints and the transcoded video content.

Furthermore, the processing hints could be added to a Synchronized Multimedia Integration Language (SMIL) file, e.g. by employing an Extensible Markup Language (XML). Rather than defining the actual formats used to represent media data, SMIL defines the commands that specify the various media contents (audio, video, text and images). Alternatively to SMIL, the Scalable Vector Graphics (SVG) file format, which enables images to be displayed in XML pages on the Web, can be used to implement the invention. SVG images are scalable to the size of the viewing windows and will adjust in size and resolution according to the window in which is to be displayed. Other alternatives are Session Description Protocol (SDP) or H.263 bit streams or other user data fields in other coding standards.

Thus, the processing hints of the present invention can be added to existing user data fields of a file that also contains the relevant transcoded media content. Alternatively, the processing hints can be provided separately as long as a rendering device is able to identify which transcoded media content the processing hints belong and should be applied to. This means that the processing hints could be regarded as meta-data associated with the transcoded media content. When provided in a separate file, this file could include an identifier of the corresponding media content file or the media content file could include an identifier of the processing hints file. Actually, any techniques that allow identification of the media content to which the processing hints should be applied, or vice versa, can be used according to the invention.

In the optional step S5, the transcoded media content and the associated processing hints are transmitted from the transcoder to a receiving rendering device. In this transmission step, the content and the hints could be included in one and the same file or are transmitted separately. The method then ends.

Herein follows several examples of possible media degradations and alterations caused by media transcodings that can be alleviated by processing and controlling processing of the transcoded media based on processing hints according to the present invention in order to illustrate the principles and advantages of the invention.

Figure 3A:
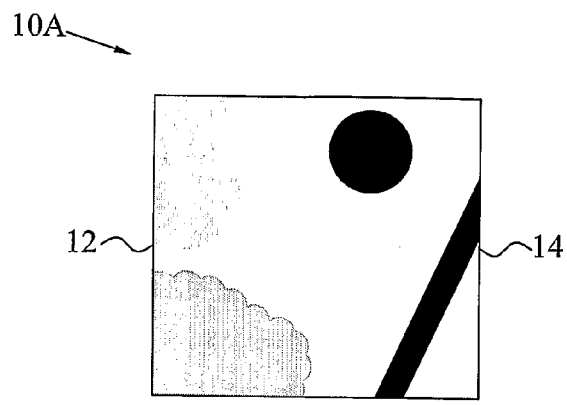
FIG. 3A illustrates unprocessed media in the form of an original image.

FIG. 3A schematically illustrates an original image 10A that is to be transcoded into a widescreen format. In this image transcoding, borders will be added to the left 12 and right 14 side of the original image 10A.

Figure 3B:
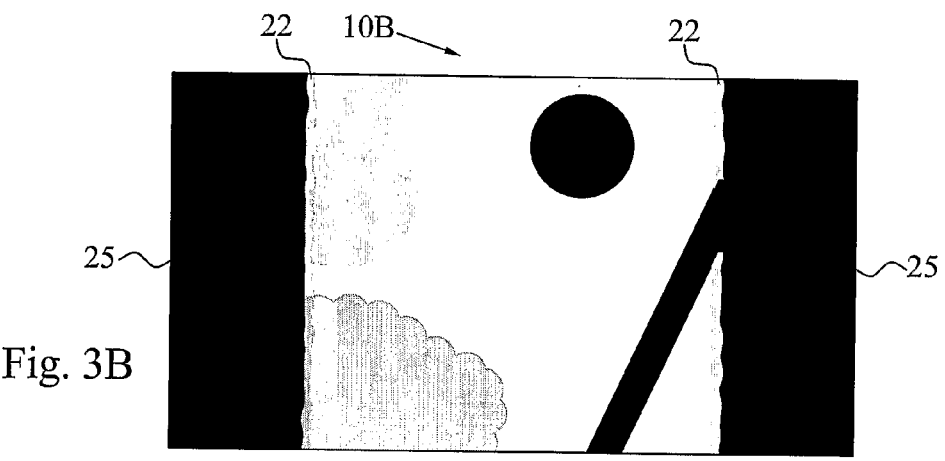
FIG. 3B illustrates a transcoded version of the original image of FIG. 3A.

FIG. 3B schematically illustrate how the resulting widescreen image 20B consisting of the original image 10B and boarders 25 will look like when rendered following transcoding. The image 20B is, thus, rendered according to prior art techniques without any post-transcoding processing based on processing hints. As is clearly evident in the figure, the color bleeding phenomenon occurs in the portions 22 of the image 20B in the interfaces between the borders 25 and the original image 10B. Thus, bleeding artifacts produced by the transcoding of the image 20B becomes so prominent in the sides 22 of the borders 25 facing the original image 10B that the user-perceived quality of the image 20B is poor. This bleeding results in that the less colored region, typically the borders 25, will show traces of the colors included in the colorful region, typically the original image 10B (and also vice versa but not equally visually apparent).

Processing hints according to the present invention can include information that identifies the areas of the transcoded image 20B that belongs to the original image 10B or the borders 25. The processing hints can then be employed, by the rendering device, for controlling the processing of the transcoded image 20B in order to reduce the visual effect of the color bleeding. For example, the image 20B can be cropped based on the processing hints by removing the borders 25 and bleeding image portion 22 resulting in the remaining original image portion 10B. New one colored borders could then be added to the image when rendering it.

Alternatively, the processing hints are used to identify, fetch (from the image file) and render only those portions of the image 20B that correspond to the original image 10B if the rendering device can handle such an image format.

Figure 3C:
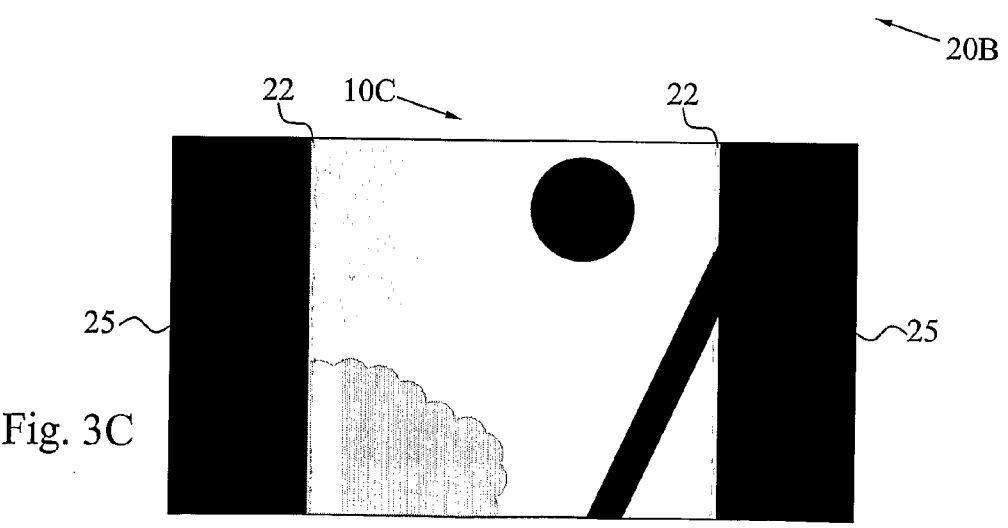
FIG. 3C illustrates the transcoded version of the original image of FIG. 3A processed according to an embodiment of the present invention.

In a preferred implementation, the borders 25 are of a pre-determined color or pre-determined colors or the processing hints include information of the color(s) of the borders 25 in addition to the information identifying the areas of the original image 10B or the borders 25. The processing hints are then employed by the rendering device or a dedicated image processor in connection with the rendering device, for rendering those parts of the image that corresponds to the borders using the pre-determined color(s) or using the color information of the hints. The remaining part of the image (corresponds to the original image) will be rendered as usual based on the colors included in the image file. FIG. 3C illustrates the transcoded image 20B of FIG. 3B processed according to the hints as disclosed above. As is seen in this FIG. 3C, the resulting transcoded, processed and rendered image 20C has much smaller bleeding regions 22 compared to the transcoded and rendered image 20B of FIG. 3B. The reason for this is that no bleeding of the colors of the original image 10C will occur in the portions of the image 20C that corresponds to the borders 25. This means that only some, visually less noticeable, bleeding of the border color into the original image 10C remains. By comparing the image processed according to the present invention in FIG. 3C with corresponding prior art images in FIG. 3B, it is evident that usage of processing hints generated based on the image transcoding will mitigate the degradations caused by the transcoding when processing the image following the transcoding based on the processing hints.

In the above-described example the processing hints, thus, includes information describing the transcoded data and identifying what alterations that has been performed or added by the image transcoding.

Note that according prior art techniques, the rendering device has no possibility to identify the border regions or the original image area in the transcoded image since the image is merely proved as an encoded sequence of ones and zeros. The bleeding problem disclosed in FIG. 3B has hitherto therefore not been solvable by the prior art image processing systems.

An example of a possible pseudo code in XML for the processing hints in this example could be according to:

```
<?xml version="1.0" encoding="ISO-8859-1" ?>
<File1>
    <Hint1>
        <border1startpixel>0</border1startpixel>
        <border1endpixel>63</border1endpixel>
        <border2startpixel>448</border2startpixel>
        <border2endpixel>511</border2endpixel>
        <bordercolor>black</bordercolor>
    </Hint1>
</File1>
```

In another example the processing hints include information of the actual value of at least one transcoding parameter employed in the transcoding parameter. This parameter is preferably a settable parameter, where the actual value of the parameter affects the resulting transcoded media content. A typical example is the brightness level of a transcoded image or video. For example, different mobile terminals are adapted, due to the particular display equipment arranged in the terminals, to different brightness levels of images displayed on the terminals. The adaptation of this brightness level of an image may be performed by the transcoder during the image transcoding or by the mobile terminal itself.

Problems might occur if the transcoder adapt the brightness level but the mobile terminal is not aware of this and also performs such a brightness level adjustment. The displayed image might then be far too dark or light for the likings of the viewer. The opposite situation can also arise if the transcoder does not perform any brightness adaptations but the mobile terminal believes that such adaptation already has been performed and does not therefore adjust the brightness of the image itself.

The processing hints could then state whether the brightness optimization already has been performed or not. Alternatively, or in addition, the brightness level adjusted to could be stated. An XML-based example of a possible pseudo code for this processing hint type could be according to:

```
<?xml version="1.0" encoding="ISO-8859-1" ?>
<File1>
    <Hint1>
        <brightness>already optimized</brightness>
    </Hint1>
</File1>
```

Another possible example is:

```
<?xml version="1.0" encoding="ISO-8859-1" ?>
<File1>
    <Hint1>
        <brightness>
            <level>5</level>
        </brightness>
    </Hint1>
</File1>
```

This principle can of course be applied to other parameters than brightness levels and the processing hints can also include information of or the actual value of multiple, i.e. at least two, such transcoding parameters.

In another example, the transcoding of a video produces much block artifacts, which cannot be "smoothed out" because the particular encoding standard employed in the video transcoding does not support post-filtering. The block artifacts will lower the user-perceived quality of the video. However, by adding processing hints to the video file that define an appropriate post-filter to be used before or during the video rendering, the block artifacts can be removed or at least lessened. Different types of post-filtering can be employed according to this example of the present invention, e.g. a low pass filtering. The pseudo code for such processing hints could then look like:

```
<?xml version="1.0" encoding="ISO-8859-1" ?>
<File1>
    <Hint1>
        <lowpassfiltering>
            <level>5</level>
        </lowpassfiltering>
    </Hint1>
</File1>
```

The transcoder that performs the media content transcoding has total knowledge of the degradations, alterations and limitations of the transcoded media output it produces. The transcoder can typically also determine the type of content that is to be transcoded, e.g. by investigating the semantics and any meta-data associated with the media content to be transcoded. In such a case, the processing hints that are generated based on the transcoding can include important information that has become lost or is, following the transcoding, at so low quality that it cannot be adequately perceived by a user when rendering the media.

For example, transcoding a video to produce a slide show containing some of the images from the video sequence results in that the sequences between the images of the slide show never reach the rendering user. Some of these sequences could include important information that the user should be aware of. The processing hints can then include e.g. text describing the missing but important information. When rendering the slide show at the user terminal, the content of the processing hints, i.e. the important information, can be displayed in a separate window or be annexed to the slide show.

In this illustrative example, the processing hints are generated based on the transcoding of the content and based on the content itself.

Figure 4A:
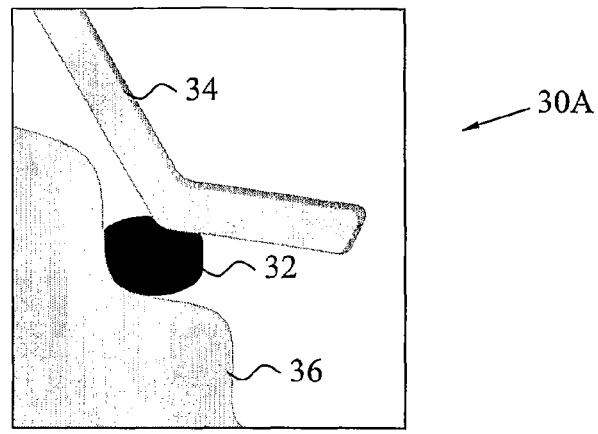
FIG. 4A illustrates unprocessed media in the form of an original image.

Another example of processing hints that can be used for adding missing information or replacing low quality/resolution data is given below in connection with FIGS. 4A to 4C. FIG. 4A schematically illustrates an enlarged still 30A from an ice hockey match. In the image of FIG. 4A, the puck 32 is partly covered by an ice hockey club 32 and a portion of one of the hockey players 36.

Figure 4B:
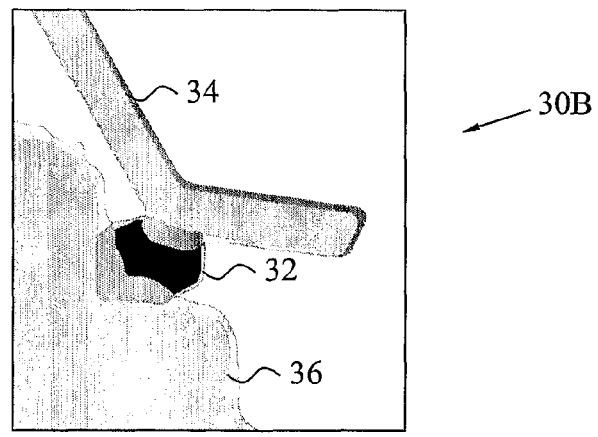
FIG. 4B illustrates a transcoded version of the original image of FIG. 4A.
Figure 4C:
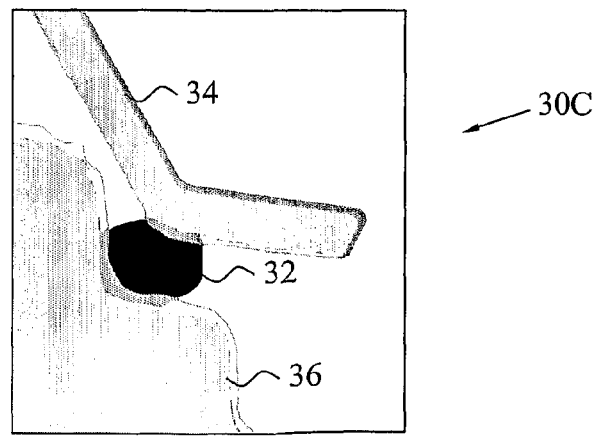
FIG. 4C illustrates the transcoded version of the original image of FIG. 4A processed according to an embodiment of the present invention.

The image 30A is then transcoded and forwarded to a user terminal where it is rendered, resulting in the image 30B of FIG. 4B. This figure illustrates how the image 30B would look like when employing the prior art techniques with image transcoding and no post-transcoding processing of the image 30B in order to mitigate the degradations caused by the transcoding. By comparing the image 30B in FIG. 4B with the corresponding non-transcoded image 30A of FIG. 4A, it is evident that puck 32, due to color bleeding and block artifacts, is much harder to distinguish and identify in the transcoded image 30B. The three objects 32, 34, 36 of the transcoded image 30B become blurred and it is hard to identify separate objects 32, 34, 36.

The processing hints according to the present invention can be used for adding information of the most important object in the image, i.e. the puck. Thus, the processing hints could include the coordinates of the puck (or more correctly information of the pixel area that corresponds to the puck) and optionally information of the color of the puck. When processing the transcoded image in the user terminal, the graphic system could "recolor" the puck by assigning the pixels of the puck, identified by means of the processing hints, the correct color value, as optionally obtained from the hints. The result will be the transcoded and hint-processed image 30C illustrated in FIG. 4C. Even though the bleeding and blurring of the hockey club 34 and hockey player 36 still remain, the hockey puck 32 is now much more prominent and easily distinguishable from the other objects 34, 36.

The above-identified examples should merely be seen as illustrative and preferred, but non-limiting, examples of processing hints and usage of processing hints according to the present invention.

According to the present invention the associated processing hints could include one or multiple hints that can be used by the user terminal in order to mitigate the deleterious transcoding processing. For example, a first hint could specify that the brightness level already has been optimized for the rendering device, a second hint that low-pass filtering of the transcoded data should be performed in the user terminal prior rendering of the data. Also processing hints for multiple data contents intended to a same rendering device could be included in a separate hint file. The pseudo code could then look like:

```
<?xml version="1.0" encoding="ISO-8859-1" ?>
<File1>
    <Hint1>
        <brightness>already optimized</brightness>
    </Hint1>
    <Hint2>
        <lowpassfiltering>
            <level>5</level>
        </lowpassfiltering>
    </Hint2>
    <Hint3>
        <!--If more than two hints-->
    </Hint3>
</File1>
<File2>
    <Hint1>
        <saturation>
            <level>5</level>
        </saturation>
    </Hint1>
</File2>
```

In the case of multiple processing hints, the user terminal could be forced to employ all of them when controlling the processing and rendering of the media or only a portion thereof, i.e. at least one processing hint.

All of the processing hints applicable according to the invention are generated based on the actual transcoding performed on the content and enables control of the subsequent processing of the transcoded media before or during (in connection with) rendering the media. The hints will reflect how the transcoding was conducted in that they include information specifying employed transcoding parameters or settings, information of the transcoded media content, information of how alterations and degradations caused by the transcoder can be combated, and/or commands to the media processor in the user terminal of how the transcoded media should be processed in order to increase the user-perceived quality thereof.

Figure 5:
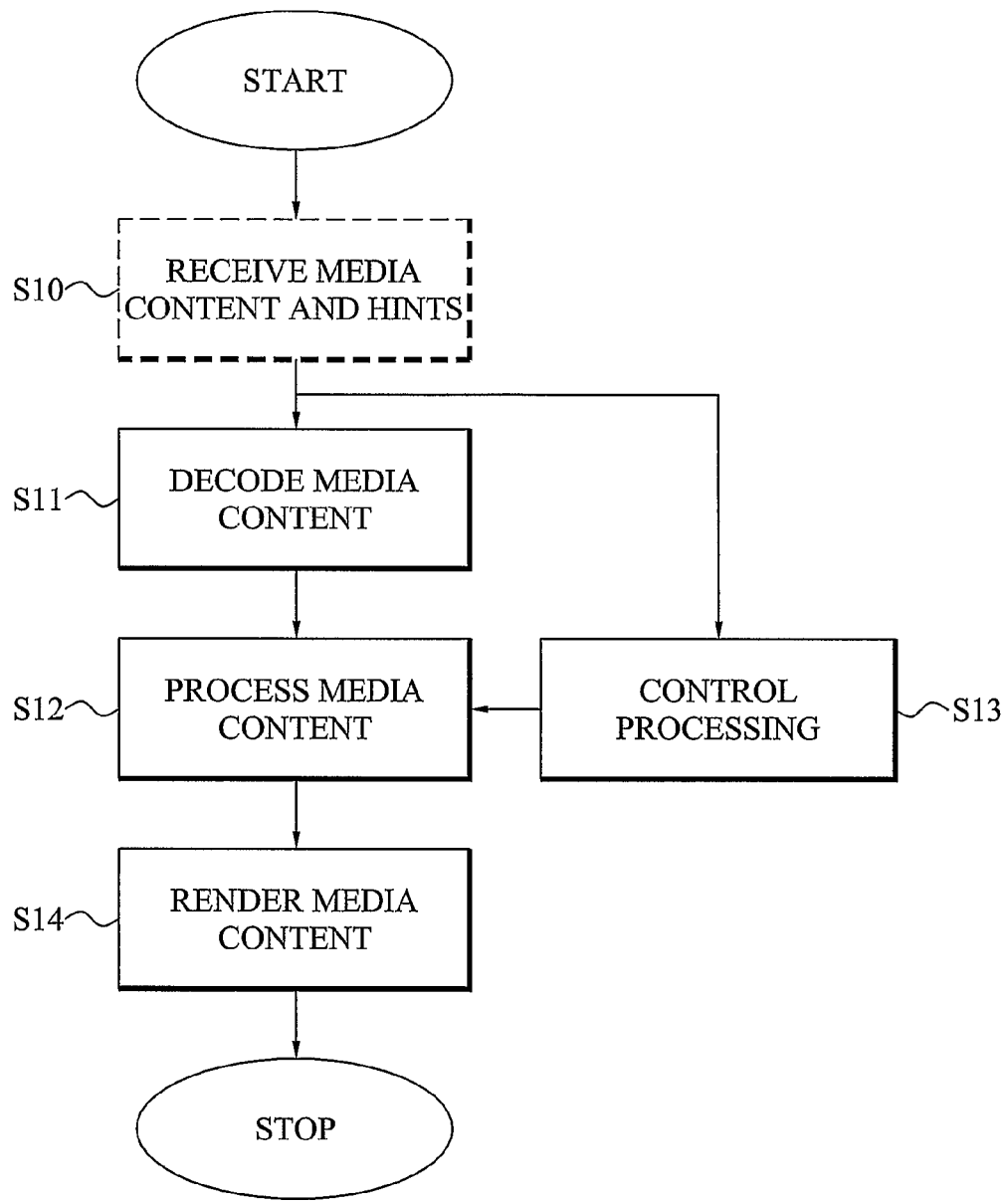
FIG. 5 is a flow diagram illustrating an embodiment of rendering transcoded media content according to the present invention.

FIG. 5 is a flow diagram illustrating a method of rendering transcoded media content according to the invention. This rendering method may be performed in a user terminal, e.g. mobile telephone, computer or other media managing and presenting unit. The method starts with the optional step S10, where transcoded media content and associated processing or rendering hints are received from an external transcoder. This transcoder could be implemented in connection with a network node in a wireless communications network to which the user terminal is connected. However, the present invention can also be applied to the situation where the transcoder and media processor and rendering device are implemented together in a same user terminal or other unit. In such a case, the receiving step S10 can be omitted.

In a next step S11, possibly received, transcoded media content is decoded in order to obtain uncoded media that will be processed and rendered. This decoding is typically performed according to well-known prior art techniques and is not further described. Thereafter, or before or during the media decoding, the processing hint(s) is (are) extracted from the media file or provided from some other source, e.g. when transmitted separately. The association between the media content and the processing hints allows identification of to which media the hints belong. The processing hints are used, in step S13, for controlling the post-transcoding processing of the decoded media content that is performed in step S12 in connection with rendering the media content. This media processing of step S12 could be performed once the media has been decoded and thereafter the media is temporarily stored in a media memory until a subsequent rendering of the media content in step S14. Alternatively, the media processing in step S12 is performed just before or during the rendering of the media so that the processed media is directly provided for rendering in step S14.

The control of the media processing in step S13 based on the processing hints can be realized by different embodiments depending on the actual contents of the hints. For example, in the case of a hint relating to brightness level of an image, the control could be that no brightness adaptation should be performed or that the brightness should be optimized as a part of the media processing. If the hints include a settable transcoding parameter, the control could be to specify an appropriate post-filtering that should be performed on the content prior the rendering. Hints with pixel coordinate and color information are used in the processing control to identify pixel in the media content and assign colors to these pixels.

The media processing that is performed according to the present invention based on or controlled based on the processing hints includes any media processing that can be employed for mitigating the alterations, degradations caused by and limitations of the previously performed media transcoding.

This means that this media processing could actually include some steps and processes in the media decoding of step S11 and/or media rendering of step S14. However, in order to simplify understanding of the present invention, in FIG. 5 the decoding and rendering have been illustrated as procedures separate from the media processing of the invention.

In either case, the so processed media content is then rendered in step S14, e.g. by being displayed on a display screen, played on video screen, played back by means of a loudspeaker, etc. depending on the actual type of media content. The rendered media has a higher quality as seen by the user compared to corresponding media for which the processing of the content with usage of the processing hints of invention has been omitted. The method then ends.

Figure 6:
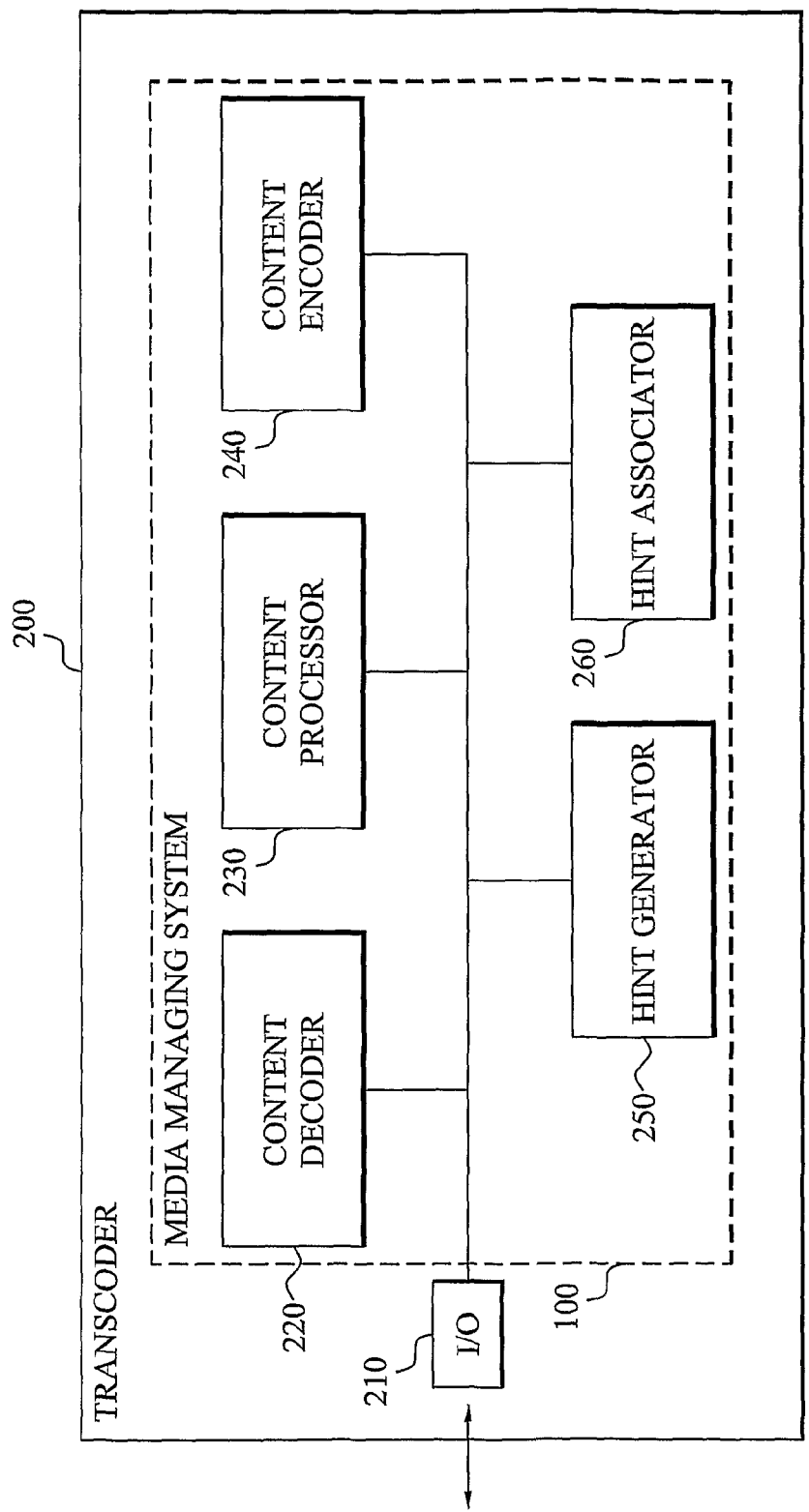
FIG. 6 is a schematic block diagram of a transcoder embodiment according to the present invention.

FIG. 6 is a schematic block diagram of an embodiment of a media content managing system 100 according to the present invention. In this illustrative embodiment, the media managing system 100 is implemented in a transcoder 200.

The transcoder 200 includes, in addition to the media managing system 100, a general input and output (I/O) unit 210 for communication with external units. This I/O unit 210 can in particular be used for receiving media content to be transcoded by the transcoder 200 and for transmitting the so-transcoded media content. Such media could be received from a dedicated content engine or provider or a communications unit in a communications system, in which the transcoder 200 is implemented for managing media transcodings on behalf of the users in the system.

It is anticipated by the present invention that the transcoder 200 of FIG. 6 actually could be implemented in connection with a content engine or provider and therefore has direct access to a memory or other storage location that contains media content that should be transcoded before delivery to a requesting user. Alternatively, or in addition, the transcoder 200 can be implemented in a user terminal in connection with the rendering device of the user terminal. Non-transcoded media content is then transocoded by the transcoder 200 into a standard or format that the user terminal can handle before it is rendered. However, as media transcoding is a relatively demanding process in terms of processing power, the transcoder 200 is preferably, for the case of user terminals with limited processing power and battery power, implemented in the network portion of the communications system.

The transcoder 200 and the media managing system 100 further include units or means 220, 230, 240 for performing the actual transcoding of the received content. These transcoding units include a content decoder 220 for decoding the provided media content (if provided as encoded media), a content processor 230 that processes the decoded media and finally an encoder 240 that encodes the content, which is now regarded as fully transcoded. The operation of the content processor 230 depends on the actual transcoding to be performed. For example, when transcoding images between different formats, this processor 230 will resize the images and possibly adding image borders to the sides of the images. Alternatively, or in addition, the content processor 230 could adjust the brightness level or some other parameter level of the content and/or identify an encoding standard or format the content encoder 240 should employed when encoding the media content. The actual operation of these transcoding units 220 to 240 is well known to the person skilled in the art and is not further discussed.

A hint generator 250 is implemented in the managing system 100 for generating processing hints according to the present invention. This generator 250 could generate one or multiple such hints for a given media content that is transcoded. The generator 250 receives information from the transcoding units 220 to 240, and in particular from the content processor 230 and encoder 240, and uses this information for generating the hints. This means that the hints can be generated simultaneously as the transcoding of the media is conducted or, at least partly, once the transcoding is completed.

The actual content of the hints depend on the media content that is transcoded, the intended destination terminal that will render the transcoded content, the media source from which the media content has been received, the actual transcoding process employed and/or what transcoding alterations that should be alleviated. The hint generator 250 preferably receives as much as possible of the above-listed information in order to generate as optimal processing hints as possible. For example, information of media source and destination can be obtained from the I/O unit 210 or some other unit that investigates the address fields of (the header of) the media file. Information of the actual transcoding and its alterations will be obtained from the content processor 230 and possibly the encoder 240. The hint generator 250 can also obtain information (meta-data) of the media content from the processor 230 or some other media analyzing unit in the managing system 100.

For example, assume that media content in the form of an image is received from a mobile unit of type X and is destined to a mobile unit of type Y. The transcoder 200 is implemented as a part of the network architecture to adapted media to the different capabilities of the mobile unit connected to the network. The image is received by the I/O unit 210 and is forwarded to content decoder 220 that decodes the image. The content processor 230, which receives the now uncoded image data, has access to e.g. a database or list of the capabilities of the different mobile unit types and can therefore, based on this information, identify how the transcoding should be performed. In this illustrative example, the processor 230 could e.g. adjust the brightness level of the image and resize it and add borders in order to generate a brightened widescreen-adapted image. The processed image is forwarded to the encoder 240, where it is encoded.

The hint generator 250 can then receive information of the brightness adjustment and coordinates of the original image or border portions in the output image. The generator 250 uses this information for generating the hints to be associated with the image content.

In another situation, the same mobile unit of type X transmits the same image but to a mobile unit of type Z. In this case, the processor 230 simply adjusts the brightness of the image. The generator 250 generates, for this example, hints in the form of the adjusted brightness level.

The two simple examples above reflect that the transcoder 200 could be regarded as transcoding the media according to one of multiple different transcoding modes, where a particular mode to employ depends on the terminal type of the transmitting and receiving terminal and/or the type of media. The hint generator 250 could then receive information that the transcoding was performed according to e.g. transcoding mode 2, and generates the hints based on this information. The hint generator 250 will, in this case, have access to a database or list defining what type of information and content the hints should include for the different transcoding modes.

The hints generated by the hint generator 250 could be in any language and form readable by the intended user terminal. A typical preferred example is the usage of an XML-based language as has been discussed in the foregoing.

The hints from the generator 250 are forwarded to a hint associator 260 of the managing system 100 that associates the hints with the transcoded content. This operation could be in the form of adding the hints to the file containing the transcoded content, e.g. in a user data field or container of the media file. The association could alternatively be in the form of an identifier in a separate hint file that allows identification of the media content or media file, to which the hints are associated.

The hints and transcoded content are provided, e.g. transmitted by the I/O unit 210, to the intended destination, where the media can be rendered.

The units 210 to 260 of the transcoder 200 may be provided as software, hardware or a combination thereof. The units 210 to 260 may be implemented together in the transcoder 200 in a single network node, e.g. a base station node or a base station controller node. Alternatively, a distributed implementation is also possible with some of the units provided in different network nodes in a communications system. Furthermore, the transcoder 200 can be arranged in a content provider in connection with the content engine or server or in a user terminal or other device having equipment for rendering the content.

Figure 7:
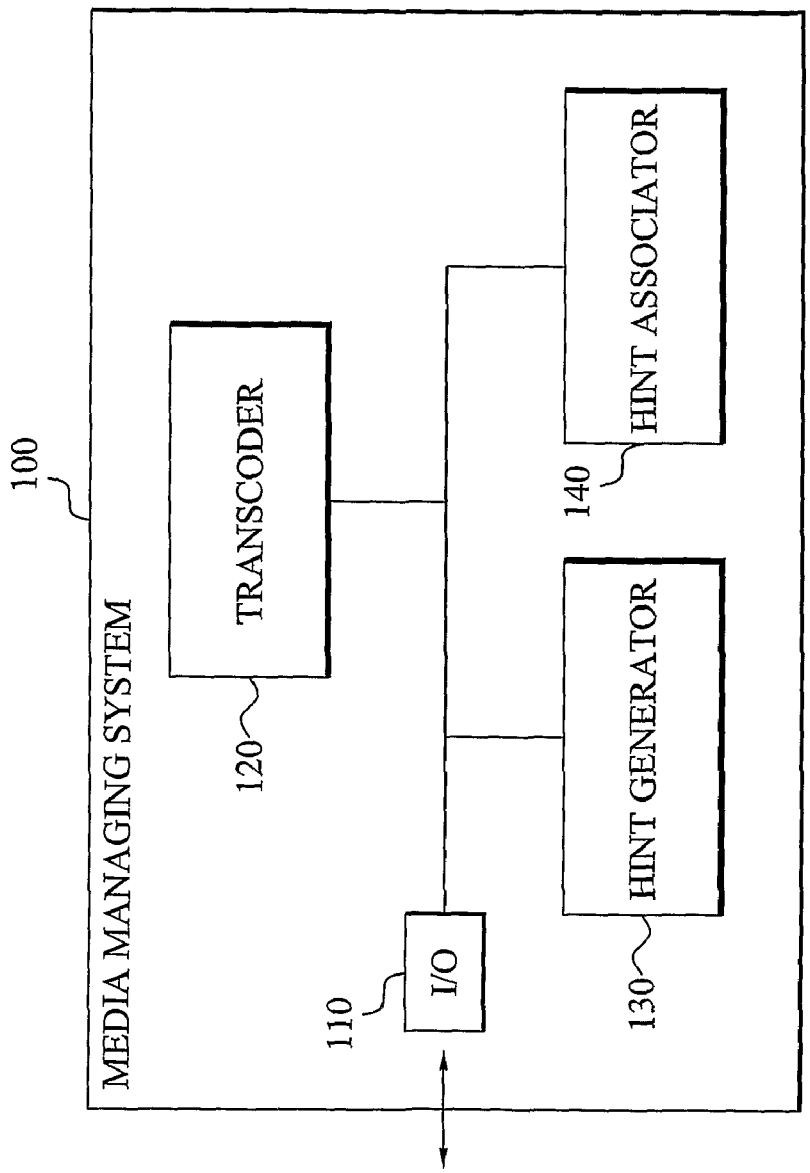
FIG. 7 is a schematic block diagram of a media managing system according to an embodiment of the present invention.

FIG. 7 is a schematic block diagram of another embodiment of a media managing system 100 according to the present invention. In this embodiment, a hint generator 130 and hint associator 130 are not implemented as a part of a transcoder 120 but are provided externally and connected to the transcoder 120.

The operation of the transcoder 120 basically corresponds to the content decoder, processor and encoder of FIG. 6 and is not discussed further. Furthermore, the operation of the hint generator 130 and the hint associator 140 corresponds to the hint generator and associator of FIG. 6. However, in the present implementation, the transcoder 120 forwards information of the transcoding process, the media content, etc. to the hint generator 130.

An I/O unit 110 is also preferably implemented in the media managing system for receiving media content and for transmitting transcoded media and associated processing hints.

The units 110 to 140 of the managing system 100 may be provided as software, hardware or a combination thereof. The units 110 to 140 may be implemented together in the managing system 100 in a single network node, e.g. a base station node or a base station controller node. Alternatively, a distributed implementation is also possible with some of the units provided in different network nodes in a communications system. Furthermore, the managing system 100 can be arranged in a content provider in connection with the content engine or server or in a user terminal or other device having equipment for rendering the content.

Figure 8:
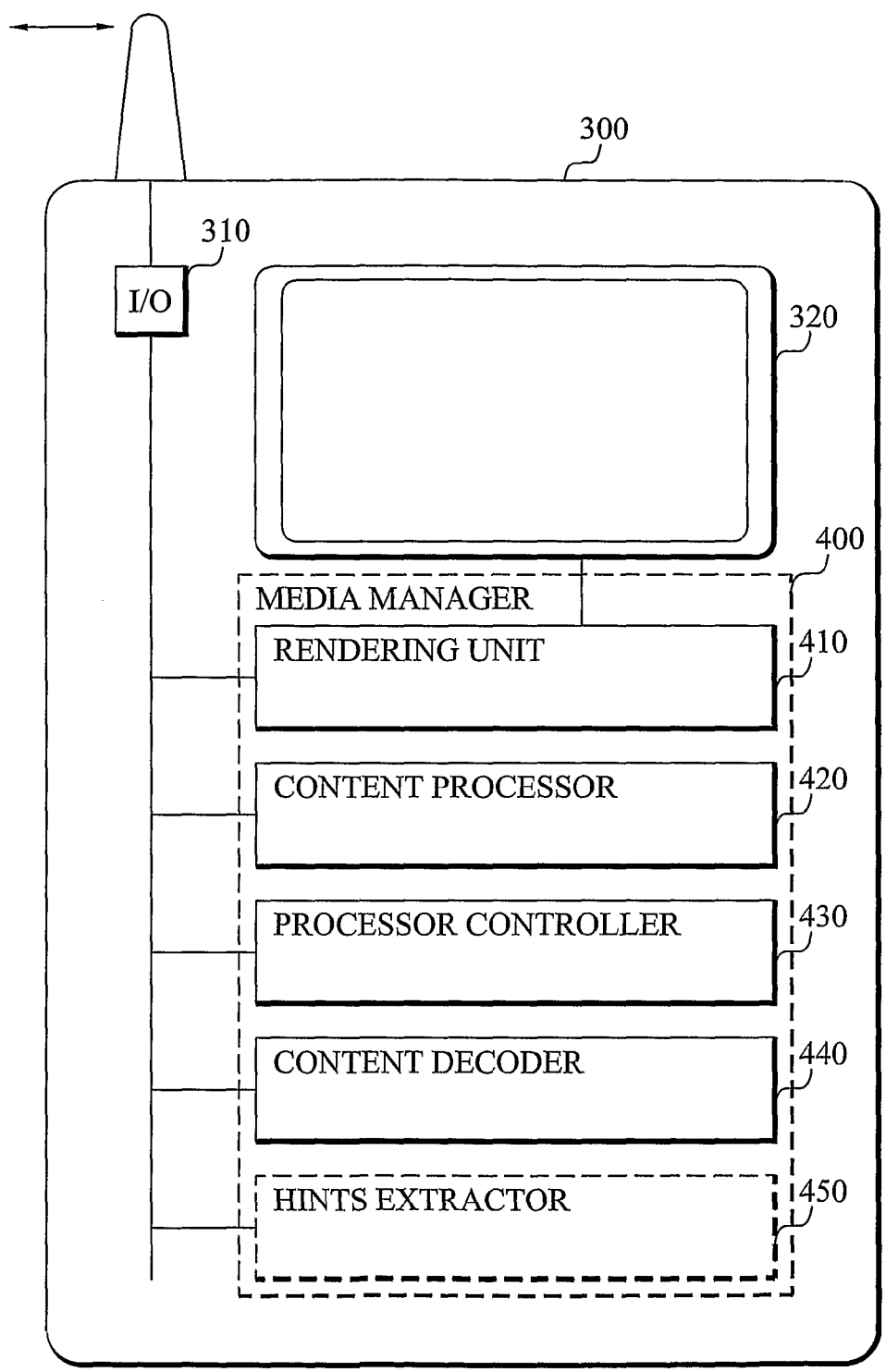
FIG. 8 illustrates an example of a media rendering terminal according to the present invention.

FIG. 8 is a schematic block diagram of a media manager 400 for rendering transcoded media content according to the present invention implemented in a mobile unit 300. The mobile unit 300 should merely be seen as an illustrative user terminal, in which the media manager 400 can be implemented. Also other user terminals, such as computers, Personal Digital Assistants (PDAs), could likewise be employed.

The mobile unit 300 includes an I/O unit 310 for communicating with external units. This I/O unit 310 is in particular configured for receiving transcoded media content and associated processing hints from an external transcoder or media managing system of the invention.

The media manager 400 of the mobile unit 300 includes an optional hints extractor 450 for extracting the processing hints form a combined media and hint file. Alternatively, the extractor 450 could be configured for retrieving the hints from a separate hint file and then employ an identifier in this hint file or in a media file in order to match the relevant processing hints and media content. A decoder 440 of the media manager 400 decodes the transcoded media content to provide uncoded media data to be processed and rendered.

The processing hints from the extractor 450 are forwarded to and used by a processor controller 430 that is implemented in the media manager 400 for controlling the operation of a content processor 420. Thus, the controller 430 uses the processing hints to determine an appropriate post-transcoding processing that should be performed by the content processor 420 in order to mitigate any introduced transcoding-generated media degradations and increase the user-perceived quality of the media. Note that this processor controller 430 could actually control the processor 420 so that no media content processing is performed. This is for example the case where the hints specify that an optimal brightness adjustment already has been performed and no such further adjustment is required. However, in most instances the controller controls an active processing of the content by e.g. instructing the processor of what post-filtering to use, of which image processing to perform, etc.

The resulting processed media content is brought to a rendering unit 410 that performs the actual media rendering, represented by displaying the media on a connected display screen 320 in the figure. In alternative embodiments, the rendering unit 410 plays the media on a video screen and/or plays the media by means of a loudspeaker.

The units 410 to 450 of the media manager 400 may be provided as software, hardware or a combination thereof. The units 410 to 450 may be implemented together in the media manager 400. Alternatively, a distributed implementation is also possible with some of the units provided elsewhere in the user terminal 300.

It will be understood by a person skilled in the art that various modifications and changes may be made to the present invention without departure from the scope thereof, which is defined by the appended claims.

The invention claimed is:

1. A media content managing method comprising the steps of:
   transcoding media content;
   generating, dirtectly based on said transcoding, processing hints that enable control of processing of said transcoded media content to increase the user-perceived quality when rendering said transcoded media content; and
   associating said processing hints with said transcoded media content.

2. The method according to claim 1, wherein said processing hints enable control of processing of said transcoded media content in order to mitigate media degradations caused by said transcoding.

3. The method according to claim 1, wherein said processing hints comprise the actual value of at least one settable transcoding parameter employed in said transcoding.

4. The method according to claim 1, wherein said processing hints define a post-filter to be employed in said processing of said transcoded media content.

5. The method according to claim 1, wherein said media content is an image, said transcoding step comprises adding a border of at least one pre-defined color to at least one side of said image to produce a resized image, and said processing hints comprise at least one of:
   information of the area of said resized image that corresponds to said image;
   information of the area of said resized image that corresponds to said border; and
   information of said at least one pre-defined color.

6. The method according to claim 1, further comprising the steps of:
   receiving said media content from a first communications unit; and
   transmitting said transcoded media content and said processing hints to a second communications unit, wherein said generating step comprises generating said transcoding hints based on said transcoding and based on information of the capabilities of at least one of said first and second communications unit.

7. The method according to claim 1, wherein said generating step comprises generating said transcoding hints based on said transcoding and based on information of said media content.

8. A method of rendering transcoded media content comprising the steps of:
   decoding said transcoded media content;
   processing said decoded media content in order to increase the user-perceived quality when rendering said processed media content;
   controlling processing of said decoded media content based on processing hints associated with said transcoded media content and generated directly based on the transcoding of said media content; and
   rendering said processed media content.

9. The method according to claim 8, wherein said processing step comprises processing said decoded media content in order to mitigate media degradations caused by said transcoding.

10. The method according to claim 8, wherein said processing hints comprise the actual value of at least one settable transcoding parameter employed in said transcoding and said controlling step comprises controlling processing of said decoded media content based on said actual value of said settable transcoding parameter.

11. The method according to claim 8, wherein said processing hints define a post-filter and said controlling step comprises setting filter parameters employed for processing said decoded media content.

12. The method according to claim 8, wherein said media content is a resized image comprising an area containing an original image and an area comprising an image border of at least one pre-defined color, said controlling step comprises identifying said area of said resized image comprising said original image based on said processing hints and said processing step comprises cropping the portion of said resized image outside of said identified area.

13. The method according to claim 8, wherein said media content is a resized image comprising an area containing an original image and an area comprising an image border of at least one pre-defined color, said controlling step comprises the steps of:
identifying, based on said processing hints, said area of said resized image comprising said image border ; and
identifying, based on said processing hints, said pre-defined color, said processing step comprises assigning said identified pre-defined color to said identified area.

14. A media content managing system comprising:
means for transcoding media content;
means for generating, directly based on said transcoding, processing hints that enable control of processing of said transcoded media content to increase the user-perceived quality when rendering said transcoded media content; and
means for associating said processing hints with said transcoded media content.

15. The system according to claim 14, wherein said generating means generates, based on said transcoding, processing hints that enable control of processing of said transcoded media content in order to mitigate media degradations caused by said transcoding means transcoding said media content.

16. The system according to claim 14, wherein said generating means generates, based on said transcoding, processing hints that comprise the actual value of at least one settable transcoding parameter employed by said transcoding means in said transcoding.

17. The system according to claim 14, wherein said generating means generates, based on said transcoding, processing hints that define a post-filter to be employed in said processing of said transcoded media content.

18. The system according to claim 14, wherein said media content is an image, said transcoding means is configured for adding a border of at least one pre-defined color to at least one side of said image to produce a resized image, and said generating means generates, based on said transcoding, processing hints that comprise at least one of:
information of the area of said resized image that corresponds to said image;
information of the area of said resized image that corresponds to said border; and
information of said at least one pre-defined color.

19. The system according to claim 14, further comprising:
means for receiving said media content from a first communications unit; and
means for transmitting said transcoded media content and said processing hints to a second communications unit, wherein said generating means is configured for generating said transcoding hints based on said transcoding and based on information of the capabilities of at least one of said first and second communications unit.

20. The system according to claim 14, wherein said generating means is configured for generating said transcoding hints based on said transcoding and based on information of said media content.

21. A network node comprising a media content managing system having
means for transcoding media content;
means for generating, directly based on said transcoding, processing hints that enable control of processing of said transcoded media content to increase the user-perceived quality when rendering said transcoded media content; and
means for associating said processing hints with said transcoded media content.

22. A media manager comprising:
a decoder for decoding transcoded media content;
a processor for processing said decoded transcoded media content in order to increase the user-perceived quality when rendering said processed media content;
a controller for controlling said processor based on processing hints associated with said transcoded media content and generated directly based on the transcoding of said media content; and
means for rendering said processed media content.

23. The media manager according to claim 22, wherein said processor is configured for processing said decoded media content in order to mitigate media degradations caused by said transcoding.

24. The media manager according to claim 22, wherein said processing hints comprise the actual value of a settable transcoding parameter employed in said transcoding and said controller is configured for controlling said processor based on said actual value of said settable transcoding parameter.

25. The media manager according to claim 22, wherein said processing hints define a post-filter and said controller is configured for setting filter parameters employed by said processor for processing said decoded media content.

26. The media manager according to claim 22, wherein said media content is a resized image comprising an area containing an original image and an area comprising an image border of at least one pre-defined color, said controller comprises means for identifying said area of said resized image comprising said original image based on said processing hints and said processor is configured for cropping the portion of said resized image outside of said area identified by said controller.

27. The media manager according to claim 22, wherein said media content is a resized image comprising an area containing an original image and an area comprising an image border of at least one pre-defined color, said controller comprises:
means for identifying, based on said processing hints, said area of said resized image comprising said image border; and
means for identifying, based on said processing hints, said pre-defined color, said processor is configured for assigning said identified pre-defined color to said identified area.

28. A communications unit comprising:
means for receiving transcoded media content; and
a media manager according to claim 22 for managing said received transcoded media content.

* * * * *